Dec. 9, 1958 R. W. AVERY 2,864,076
LOGICAL CIRCUITS
Filed Dec. 4, 1952
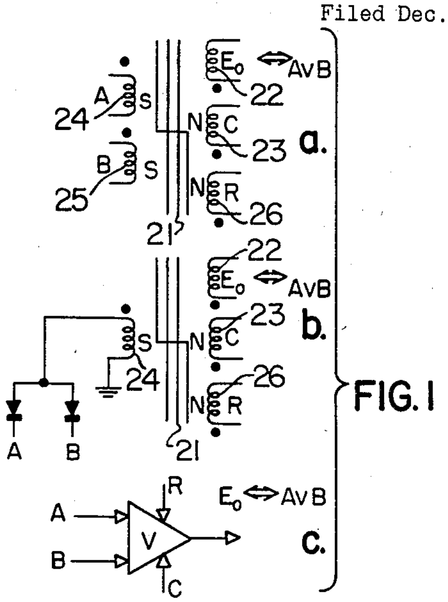
FIG. 1
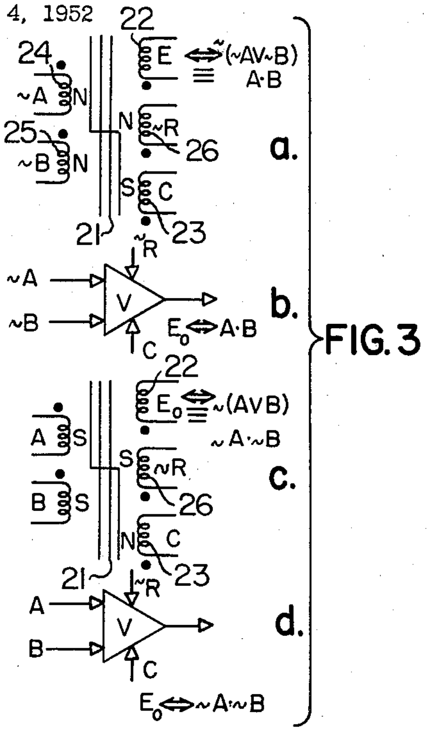
FIG. 3
FIG. 2
| A | B | LOGIC |
|---|---|---|
| 1 | 1 | A·B, AvB, ~(~Av~B) |
| 0 | 0 | ~A·~B, ~Av~B, ~(AvB) |
| 1 | 0 | AvB, ~Av~B |
| 0 | 1 | AvB, ~Av~B |
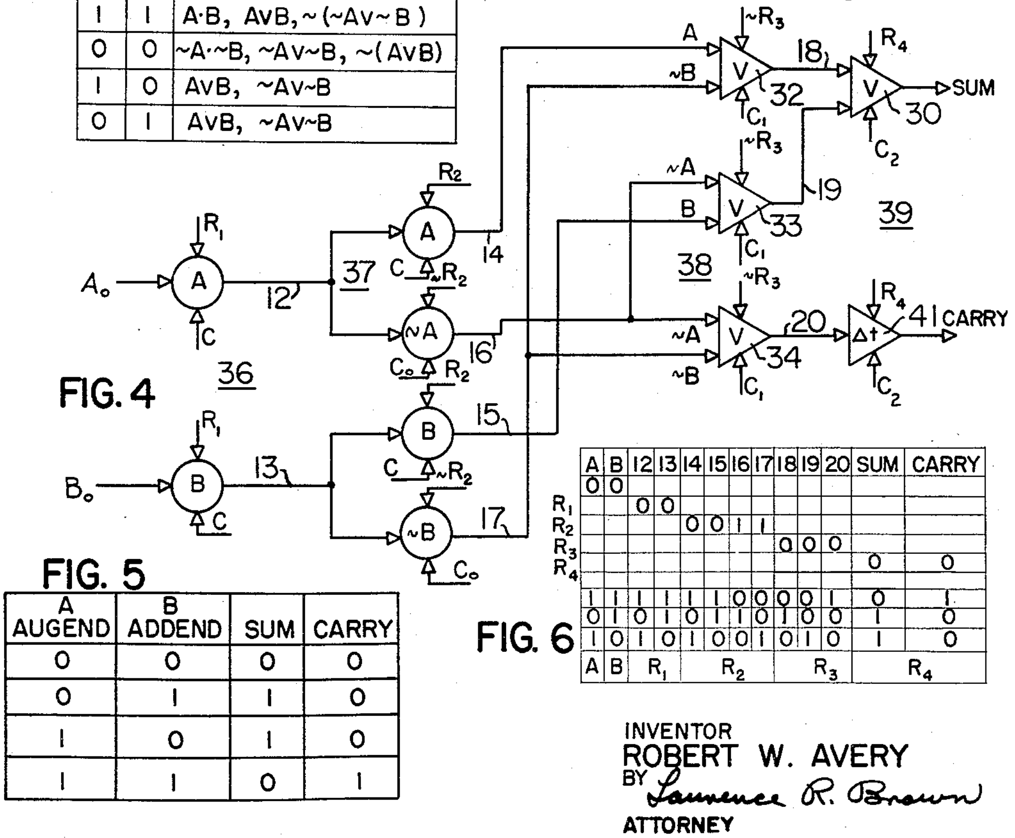
FIG. 4 FIG. 5
| A AUGEND | B ADDEND | SUM | CARRY |
|---|---|---|---|
| 0 | 0 | 0 | 0 |
| 0 | 1 | 1 | 0 |
| 1 | 0 | 1 | 0 |
| 1 | 1 | 0 | 1 |
FIG. 6
| | A | B | 12 | 13 | 14 | 15 | 16 | 17 | 18 | 19 | 20 | SUM | CARRY |
|---|---|---|---|---|---|---|---|---|---|---|---|---|---|
| | 0 | 0 | | | | | | | | | | | |
| $R_1$ | | | 0 | 0 | | | | | | | | | |
| $R_2$ | | | | | 0 | 0 | 1 | 1 | | | | | |
| $R_3$ | | | | | | | | | 0 | 0 | 0 | | |
| $R_4$ | | | | | | | | | | | | 0 | 0 |
| | | | | | | | | | | | | | |
| | 1 | 1 | 1 | 1 | 1 | 1 | 0 | 0 | 0 | 0 | 1 | 0 | 1 |
| | 0 | 1 | 0 | 1 | 0 | 1 | 1 | 0 | 1 | 0 | 0 | 1 | 0 |
| | 1 | 0 | 1 | 0 | 1 | 0 | 0 | 1 | 0 | 1 | 0 | 1 | 0 |
| | A | B | $R_1$ | | $R_2$ | | | | $R_3$ | | | $R_4$ | |
INVENTOR
ROBERT W. AVERY
BY Lawrence R. Brown
ATTORNEY United States Patent Office 2,864,076

Patented Dec. 9, 1958

2,864,076

LOGICAL CIRCUITS

Robert William Avery, Clifton Heights, Pa., assignor to Burroughs Corporation, a corporation of Michigan Application December 4, 1952, Serial No. 324,118

5 Claims. (Cl. 340—174)

This invention relates to logical circuits and methods and more particularly it relates to logical circuits useful in electronic computer systems, or the like, which may comprise static magnetic circuit elements.

Static magnetic circuit elements have been known to the prior art as indicated in articles such as that entitled "Magnetic Triggers" published in the June 1950 issue of the Proceedings of the I. R. E. by A. Wang. These elements have cores of a material having high magnetic remanence. Thus, when one or more windings are placed about the magnetic core, it may be permanently magnetized in either direction by a corresponding flow of current through the windings. When the core is in one remanence condition and the state of flux is reversed by current in a winding, a high output voltage will be produced in the coils wound upon the core. When the state of flux is not changed, however, very little output voltage is induced.

When at least two input windings are used with a static magnetic element of the type described, an input potential at either one or the other winding may cause a reversal of the remanence condition. Such a circuit therefore operates as an alternative circuit, designated an "or" circuit in logical terminology. This occurs when the core stores a flux polarity indicative of the presence of at least one input signal. A read-out interrogation signal may then be applied to determine the polarity of the core remanence, and if desired, output signals may be rectified to provide a signal only when one polarity is present.

In order to provide an output signal in the described alternative circuit the remanence condition is initially set in one polarity by a reset or clear signal. A shift or read-out signal may be provided after storage of information in the core to induce an output potential having a polarity indicating the magnetic state of the core. With a properly poled rectifier in the output circuit there will be an output signal provided only if the condition of remanence in the core has been reversed by the read-out signal. The rectifier also prevents output signals at the time an input signal initially changes the state of operation, since the polarity of the output signal is caused by a change of the remanence condition to opposite polarity than that provided by the read-out signal.

In the design of electronic computer circuits it is necessary to provide not only alternative circuits but also conjunctive or "and" circuits, which provide output signals only when a plurality of input signals arrive in conjunction, as well as logical "not" circuits. The characteristics of the static magnetic element are such that "or" operation is preferred however. It would be difficult and expensive to provide an entire system with intermingled static magnetic units and other types of computer elements, because of impedance matching requirements, etc. Otherwise it is hihgly desirable to utilize only static magnetic circuit elements because of size limitations, ruggedness and the desirability of using a minimum of standard circuit units. It is, therefore, an object mum number of standard circuit units. It is, therefore, an object of the invention to provide static magnetic circuits capable of "and" operation.

It is a general object of the invention to provide improved static magnetic circuits.

A further object of the invention is to provide multipurpose computer circuits utilizing magnetic elements operating solely upon an alternative principle.

Another object of the invention is to provide circuits and methods for utilizing static magnetic elements to obtain logical "not" operation therefrom.

Other objects and features of advantage will be described throughout the detailed description of the invention which follows. To more readily show the nature of the invention and its mode of operation the description is accompanied with a set of drawings, in which:

Figs. 1*a*, *b* and *c* show schematically different alternative type static magnetic circuits which may be utilized in accordance with the teachings of the present invention;

Fig. 2 is a truth table with accompanying formulas of the logic used in accordance with the teachings of the invention;

Figs. 3*a*, *b*, *c* and *d* show schematically different conjunctive type static magnetic circuits constructed in accordance with the invention;

Fig. 4 diagrammatically shows a binary bit addition circuit constructed in accordance with the principles of the invention;

Fig. 5 is a truth table illustrating the desired mode of operation of the binary bit addition circuit of Fig. 4; and Fig. 6 is a tabulation indicating the mode of operation at different positions in the circuit of Fig. 4.

Throughout the following specification like reference characters will be used to designate similar circuit components to facilitate comparison between the several figures.

Those details of notation used in the specification may be observed in conjunction with the circuits shown in the several views of Fig. 1. Each of the magnetic cores 21 of the static magnetic elements is schematically drawn to indicate its propensity for remaining in a permanent magnetic remanence condition of one or the other polarity when excited by a saturating flux source. This saturating source may be provided by current flowing in any of the several windings 22–26. The direction of current flow may be designated by the dots adjacent one end of the winding, and the magnetic polarity which current in the windings tends to establish in the cores 21 is designated by the arbitrarily assigned symbols N and S located adjacent the windings. It is understood that the directions of current flow, the magnetic polarities, and the number of windings utilized in specific circuit applications described hereinafter may be altered without departing from the spirit or the scope of the present invention. In this respect a separate winding is shown for each function in order to more clearly set forth the principle of operation of the invention, although different windings may be used for more than one purpose in commercially designed circuitry.

In the specification and drawings the symbol $\vee$ is used to indicate the term "or" and the symbol $\cdot$ is used to indicate the term "and." The letters A and B designate input signals, the letter R indicates a read-out or shift signal, and the letter C designates a clear or reset signal. The symbol $\sim$ is used to indicate the absence or the negative of a particular condition, thereby designating the logical proposition "not." The symbol $\Longleftrightarrow$ indicates the logical equality "if and only if."

Referring now to the alternative static magnetic circuit of Fig. 1*a*, it may be assumed that the reset signal winding 23 is provided to initially establish a remanence magnetic flux condition designated as N. An input signal at either of the input windings 24 or 25 will then change the flux condition to a polarity of S. As hereinbefore mentioned, output potential may be blocked from output circuits if desired at this time by the connection of a rectifier in series with the output winding 22, even though the state of flux in changing from one condition to another tends to develop a potential in each of the windings, A read-out signal at winding 26 may be applied after the input or read-in signal for re-establishing a polarity of N. Since output signals are only provided by the readout signal with a change of remanent flux polarity there will only be an output $E_0$ if either signal A or signal B has established a polarity of S in the core 21 after the clear signal actuation. Thus, the circuit described is highly desirable for operation as an "or" circuit.

Should only one input winding 24 be available, alternative operation may be provided with the modified "or" circuit of Fig. 1*b*, which operates in a similar manner except that rectifier switches are utilized for presenting one or more signals to the solitary input winding 24.

Fig. 1*c* represents a logical schematic block designation of either of those circuits shown in Figs. 1*a* and 1*b*.

The truth table of Fig. 2 designates the logic applicable for all possible conditions accompanying the presence and absence of one or two input signals A and B. According to this logic $A \cdot B \equiv \sim(\sim A^v \sim B)$. Likewise $$\sim A \cdot \sim B \equiv \sim(A \sim B)$$

Consideration of these identities will show that a conjunctive condition may be established by an alternative circuit if suitable means is provided for establishing a "not" condition.

The circuits of Fig. 3 illustrate the embodiment of the foregoing logic to provide "and" circuit operation with a static magnetic "or" circuit type of operation. Thus, in Fig. 3*a* it is noted that the input windings 24 and 25 are designated as having ~A and ~B input signals applied thereto. This notation ~A and ~B designates respectively input signals occurring at windings 24 and 25 with enough amplitude and of such polarity that they establish a magnetic remanence polarity of N in the element 21. The notation (~A) assigned to the signal at winding 24 designates that a signal pulse arrives whenever a signal condition A at some other point in the logical system, such as at winding 24 of Fig. 1*a*, is not present. Such a signal condition is generated by that mode of operation of the circuits of Figs. 3*a* and 3*c* which is considered a "not" function in accordance with one phase of operation. A further aspect of the same circuits is the provision of "and" logic simultaneously in the same magnetic element. To perform the "not" function on a single signal it is necessary only to provide one input signal and corresponding winding, and the "not" operation is dependent upon the provision of a ~R readout pulse.

In this circuit operation the core is started through a cyclic storage operation sequence by a clear signal at winding 23 which places the core 21 in an S polarity. Next a signal period occurs and finally the readout signal (~R) at winding 26 tends to set the core to the same polarity (N) as the signal has produced. Conversely, the readout signal R (as in Fig. 1*a*) serves to switch the core to an opposite polarity than the signal after an input signal arrives. Accordingly, the ~R designation indicates a readout pulse presented in such amplitude that it will switch the core but in such polarity that the core is not switched when a signal has been presented previously in the operation cycle, because in that event the core is already in the readout polarity.

In the "and" mode of circuit operation, two or more input signals are provided in the circuit of Fig. 3*a* in the same manner as the "or" circuit of Fig. 1*a*. The "and" operation depends upon the equivalent logical expressions of Fig. 2. There it is seen that A·B is equivalent to $\sim(\sim A^v \sim B)$ and by application of the "not" mode of operation to the "or" mode of operation while providing ~A and ~B input signals, the circuit of Fig. 3*a* is caused to perform the A·B "and" operation in a single core 21.

The read-out winding 26 provides a flux of the same polarity (N) as that of the input windings thereby performing a ~R logical function. Thus, an output signal is provided by the read-out signal only if there is neither input signal ~A nor ~B present and the core 21 remains in the initial cleared polarity S. Accordingly, the output signal produced at this time is provided in accordance with the logic $E_0 \Longleftrightarrow \sim(\sim A^v \sim B)$ which is identical to $A \cdot B$. This conjunctive circuit is readily obtained with a static magnetic element, because it is only necessary to change the polarity of the saturating flux provided by one or more of the respective windings in the "or" type circuits of Fig. 1*a* or 1*b*. Fig. 3*b* designates the logical block diagram representation for the "and" circuit of Fig. 2*a* utilizing the basic "or" connection.

A spurious output signal is produced by the element 21 of Fig. 3*a* whenever the input signals ~A and ~B occur to switch the core from its cleared condition of S polarity, and therefore the useful output signal is presumed to occur only at a time in an operation cycle that the readout pulse ~R occurs. Provisions for time discrimination are made in the logical design of most systems in which this type of circuit is used, as a matter of course, and clear signals are ordinarily provided at definite clock period intervals avoiding any unwanted signal occurrences. Thus, in the usual coupled magnetic circuits, a succeeding core load coupled to the output winding 22 might be reset to a signal receptive condition with a clock pulse just prior to the arrival of the readout pulse ~R at element 21.

A further embodiment of a conjunctive type circuit utilizing a static magnetic element is shown in Fig. 3*c* wherein the output signal is provided when the condition $\sim A \cdot \sim B$ exists. In this case the output signal $\sim A \cdot \sim B$ indicates the absence of both signals A and B at the input windings, rather than the converse situation in Fig. 3*a* wherein the $A \cdot B$ output signal indicates the absence of both signals ~A and ~B at the input windings. Thus, this corresponds to the indication of signal condition 0, 0 shown in the chart of Fig. 2 rather than the signal condition 1, 1, which is indicated by the circuit of Fig. 3*a*. Otherwise, in Fig. 3*c*, the circuit operates in a manner similar to that of the circuit in Fig. 3*a* wherein each of the input windings and the read-out winding are poled to establish a flux of the same polarity, but is designed for the output logic $E_0 \rightleftarrows \sim(A^v B)$ because the input signals A and B are applied to the input windings rather than the signals ~A and ~B. In this circuit it is illustrated that the "not" and "and" modes of operation may be performed with input signals of S polarity as well as for the N polarity of Fig. 3*a* shows the block diagram equivalent to this conjunctive circuit. Note that in Figs. 3*b* and 3*d* the "or" symbol *v* within the block and the ~R designation identifies the conjunctive "and" operation performed by the alternative "or" type circuit.

It is possible with the static magnetic circuits above described, operating only as "or" circuits, to perform all steps of computation necessary in different types of computer circuits. Thus, the circuit of Fig. 4 exemplifies a bit addition circuit of the type used in electronic adder devices. One alternative type circuit 30 and three conjunctive "or" circuits 32, 33 and 34 are provided. As hereinbefore explained the conjunctive circuits provided are in actuality alternative circuits providing output signals in response to read-out excitation only in the absence of all input signals to the alternative circuits. An input network provides to each of the alternative circuits a pair of signals respectively representative of an augend and addend condition, so that there is provided a carry signal at one conjunctive circuit 34 and a sum signal at the summation alternative circuit 30 which detects signals at either of the conjunctive circuits 32 and 33.

The input circuit at bank 36 converts augend and addend signals A and B respectively into three alternative signal groups A, ~B and ~A, B and ~A, ~B by means of circuits in bank 37. The signal groups are individually presented to corresponding ones of the alternative circuits 32, 33 and 34.

Inspection of the truth table shown in Fig. 5 will show the desired sum and carry signals for all combinations of augend and addend signals. The different signal states established by all possible combinations of A and B in the designated circuits of Fig. 4 at each of the leads 12 through 20 are tabulated in the table of Fig. 6. It is noted that a separate read-out operation is performed in four different banks of elements in four chronological steps indicated by appropriate read-out signal sub-scripts 1–4 showing the time sequence. Thus, the banks of elements 36 to 39 are actuated in discrete steps in a corresponding time sequence. Bank 36 therefore at the time one performs the functions indicated at leads 12 and 13, while bank 37 performs the functions indicated at leads 14 to 17 at time two, etc.

The chart of Fig. 6 specifies operation of the circuit of Fig. 4 in accordance with the following detailed description. Each element is considered to be in a cleared condition of 0 at the time input signals arrive, and thus input elements A and B in bank 36 are in 0, 0, condition. Each of these input elements may be considered a circuit as shown in Fig. 1*a* with only a single input winding if desired, but may be any element in a system providing representative signals A and B at a time period $t_1$ upon leads 12 and 13 respectively. In explanation of the circuits shown, it is assumed that signal intelligence $A_0$ and $B_0$ arrives at the respective elements at an initial sequential time period $t_0$ in such amplitude and polarity that the elements are switched to their "1" tsate in the presence of a signal as indicated by the first two columns A and B of the chart of Fig. 6 for each of the four possible input signal combinations. In this simple case the cores are cleared by the readout pulses $R_1$ at times $t_1$ when an output pulse, if occurring, is applied to leads 12 and 13. In such a case the clear signal C is not required, but is indicated since the input elements may be in a system and may perform other logical functions requiring a separate clear operation.

Thus, input signals A and B respectively arrive at the four elements of bank 37 on leads 12 and 13 during the time period $t_1$ as indicated by the respective columns $R_1$ of Fig. 6 for all signal conditions. The elements of bank 37 having output leads 14 and 15 are identical to those in bank 36 and are provided only for timing purposes to assure that all signals in columns $R_2$ of Fig. 6 arrive during the same time period $t_2$. However, the elements having output leads 16 and 17 serve to perform the "not" function hereinbefore explained, and thus are constructed in the manner of the circuits of Figs. 3*a* or 3*c* with only a single input signal. These elements, therefore, require clearing signals since the readout pulses $R_2$ leave the core in the same polarity as input signals. A convenient time for the clearing operation is just before arrival of signals during time period $t_1$ such as during the time period $t_0$ signified by the $C_0$ notation. Since the usable output signals from these elements occur only during time period $t_2$ and any switching of the elements during time period $t_1$ as may occur if "1" signals are present on leads 12 or 13 is considered a spurious response, the succeeding circuits 32, 33 and 34 may be cleared during the time period $t_1$ as indicated by the $C_1$ notation. Thus, the respective signals are produced as indicated in columns $R_2$ of Fig. 6 wherein signal pulses "1" occur at leads 16 and 17 whenever corresponding input signals are not present.

As indicated by columns $R_3$ of Fig. 6, output signals appear at leads 18, 19 and 20 during the time period $t_3$. Each of the circuits 32, 33 or 34 is similar to the "and" circuit of Figs. 3*a* or 3*c* as signified by the logical terminology used similar to that of Figs. 3*b* and 3*d*. In the case of circuits 32 and 33 the input signals which arrive are indicative of the output functions of elements in bank 37, and the mixture of signal notation (A and ~B or ~A and B) does not indicate a change in circuit operation but merely a change in the name of the applied signals to indicate their relationship to the incoming augend and addend signals A and B.

Any spurious signal of the leads 18, 19 or 20 when the elements 32, 33 or 34 switch by means of an incoming signal "1" during time period $t_2$ is prevented from affecting the output elements 30 and 41 of bank 39 because of the simultaneously occurring clear pulse which is designated $C_2$ to indicate the timing relationship. Thus, the signals at leads 18, 19 and 20 for all possible input signal conditions are specified in columns $R_3$ of the chart of Fig. 6 and when they occur they have the respective logical relationships $(\sim A \cdot B)$, $(A \cdot \sim B)$, and $(A \cdot B)$ with reference to the input augend and addend signals A and B. A comparison of these signals with the sum and carry requirements of Fig. 5 indicate that a binary addition has resulted.

To combine the two sum signals at a single lead, the circuit 30 of bank 39 is used, and this is an "or" circuit similar to the circuits of Figs. 1*a* or 1*b*. Whenever it is required that the carry signal be produced during the same time period as the combined sum signal of element 30, the time delay circuit 41 designated $\Delta t$ is provided for actuation by the readout pulse $R_4$. This circuit is similar to those in bank 37 coupled to leads 14 and 15.

The principle of magnetically shifting information along a group of static magnetic elements by sequentially presented read-out or advancing pulses for the purpose of providing a storage or delay of information is known in the art. In this particular circuit, however, it is noted that functional modification of the storage condition is performed in each bank of elements so that in addition to the delay and storage a complete logical operation may be performed by the time an output signal is read from a magnetic shift type register. This feature is more fully described in the copending application of I. L. Auerbach and R. W. Avery for Magnetic Computer Circuits Serial No. 324,116, December 4, 1952 and assigned to the same assignee.

It is apparent from the foregoing description that novel electronic apparatus for performing conjunctive computer logic is provided in accordance with the present invention by the combination of an alternative circuit and a detection device providing an output signal only when an alternative condition is not present. When the principles of the invention are applied to static magnetic elements, a particularly efficient result is obtained, as a complete computer may thereby be constructed without the use of intermediate vacuum tube "and" circuits, or the like.

Having therefore clearly described the invention and its manner of operation, it is apparent that certain novel features are provided thereby which improve the efficiency of prior art devices. Accordingly Letters Patent are desired for the subject matter found described in particularity in the appended claims as representative of the nature of the invention.

I claim:

1. A conjunctive electronic circuit for performing the logical "and" function, said circuit comprising; a static magnetic element capable of assuming either a first or a second stable state of magnetic remanence, said states being of opposite polarities; means, including a winding coupled to said element, for establishing said element in said first stable state of magnetic remanence; input means, including at least one winding coupled to said element, adapted to receive a plurality of input signals during a signal period but not necessarily in coincidence, each of said input signals being of a polarity and magnitude to switch said element from said first to said second state of magnetic remanence, at least two of said input signals being received at said input means during each of said signal periods unless selectively inhibited or inverted in polarity by a respective data signal; inhibit means for selectively inhibiting or inverting the polarity of said core-switching input signal in response to a respective data signal; read-out means, including a winding coupled to said element, for switching or tending to switch said element from said first to said second state, the actual switching of said element in response to said read-out means occurring only in the absence of all such core-switching input signals during said input-signal period; and output means, including a winding coupled to said element, for developing an output signal in response to the switching of said element responsive to said read-out means, the development of an output signal signifying the presence of a respective data signal for inhibiting or inverting the polarity of each input signal.

2. Apparatus for performing the logical "not" function, said apparatus comprising in combination: a static magnetic element capable of assuming either a first or a second state of magnetic remanence, said states being of opposite polarities; means, including a winding coupled to said element, for presetting the core to said first state of magnetic remanence; input means, including at least one winding coupled to said element, for applying one or more input signals to said element during an input-signal period, each input signal being of a magnitude and sense to switch said element from said first to said second state of magnetic remanence; read-out means, including a winding coupled to said element, for switching or tending to switch said element from said first to said second state of magnetic remanence, the actual switching of said element in response to said read-out means occurring only in the absence of said input signals during said input-signal period; and means responsive to the actual switching of said element in response to said read-out means for developing an output signal signifying that no input signal was received during said input-signal period.

3. Apparatus for performing the logical "not" function, said apparatus comprising in combination: a static magnetic element capable of assuming either a first or a second state of magnetic remanence, said states being of opposite polarities; means, including a winding coupled to said element, for presetting the core to said first state of magnetic remanence; input means, including at least one winding coupled to said element, for applying two or more input signals to said element during an input-signal period, each input signal being of a magnitude and sense to switch said element from said first to said second state of magnetic remanence; read-out means, including a winding coupled to said element, for switching or tending to switch said element from said first to said second state of magnetic remanence, the actual switching of said element in response to said read-out means occurring only in the absence of said input signals during said input-signal period; and means responsive to the actual switching of said element in response to said read-out means for developing an output signal signifying that no input signal was received during said input-signal period.

4. Apparatus for performing the logical "not" function, said apparatus comprising in combination: a static magnetic element capable of assuming either a first or a second state of magnetic remanence, said states being of opposite polarities; means, including a winding coupled to said element, for presetting the core to said first state of magnetic remanence; input means, including at least two separate windings coupled to said element, for applying two or more input signals to said element during an input-signal period, each input signal being of a magnitude and sense to switch said element from said first to said second state of magnetic remanence; read-out means, including a winding coupled to said element, for switching or tending to switch said element from said first to said second state of magnetic remanence, the actual switching of said element in response to said read-out means occurring only in the absence of said input signals during said input-signal period; and means responsive to the actual switching of said element in response to said read-out means for developing an output signal signifying that no input signal was received during said input-signal period.

5. Apparatus for performing the logical "not" function, said apparatus comprising in combination: a static magnetic element capable of assuming either a first or a second state of magnetic remanence, said states being of opposite polarities; means, including a winding coupled to said element, for presetting the core to said first state of magnetic remanence; input means, including at least one winding coupled to said element and two or more electrical conductors each connected to one end of said input winding by a different asymmetrical conducting device, for applying two or more input signals to said element during an input-signal period, said asymmetrical conducting devices being so poled that a common terminal of each is connected to said one end of said input winding, each input signal being of a magnitude and sense to switch said element from said first to said second state of magnetic remanence; read-out means, including a winding coupled to said element, for switching or tending to switch said element from said first to said second state of magnetic remanence, the actual switching of said element in response to said read-out means occurring only in the absence of all input signals during said input-signal period; and means responsive to the actual switching of said element in response to read-out means for developing an output signal signifying that no input signal was received during said input-signal period.

References Cited in the file of this patent

UNITED STATES PATENTS

| | | |
|---|---|---|
| 2,654,080 | Browne | Sept. 29, 1953 |
| 2,708,722 | Wang | May 17, 1955 |

OTHER REFERENCES

Miles: Saturable Core Reactors as Digital Computer Elements, U. S. Publication Board Report No. 98367 (Engineering Research Associates, Contract NO bsr 42001), 1949.

Rajchman: Static Magnetic Matrix Memory and Switching Circuits, RCA Review, June 1952.

Ramey: The Single-Core Magnetic Amplifier as a Computer Element, volume 71, AIEE Transactions (copyright 1952).

Kalin: Formal Logic and Switching Circuits; Proc. Assoc. Computing Machinery, pages 251–257 (1952).

Haynes: Magnetic Cores as Elements of Digital Computing Systems, thesis paper in University of Illinois Library December 28, 1950; pp. 37–45 incl. and 64–69 incl.

Saunders: Magnetic Binaries in the Logical Design of Information Handling Machines; Proc. Assoc. Computing Machinery, 1952; pp. 223–220.

UNITED STATES PATENT OFFICE

Certificate of Correction

Patent No. 2,864,076 December 9, 1958

Robert William Avery

It is hereby certified that error appears in the printed specification of the above numbered patent requiring correction and that the said Letters Patent should read as corrected below.

Column 1, line 68, for "hihgly" read —highly—; lines 71 and 72, strike out "It is, therefore, an object mum number of standard circuit units."; column 3, line 6, for "windings," read —windings.—; line 27, for that portion of the formula reading "$(A \sim B)$" read —$(A\ v\ B)$—; column 4, line 18, for "Fig. 2*a*" read —Fig. 3*a*—.

Signed and sealed this 19th day of May 1959.

[SEAL]

Attest:
KARL H. AXLINE,
*Attesting Officer.*

ROBERT C. WATSON,
*Commissioner of Patents.*